UNITED STATES PATENT OFFICE.

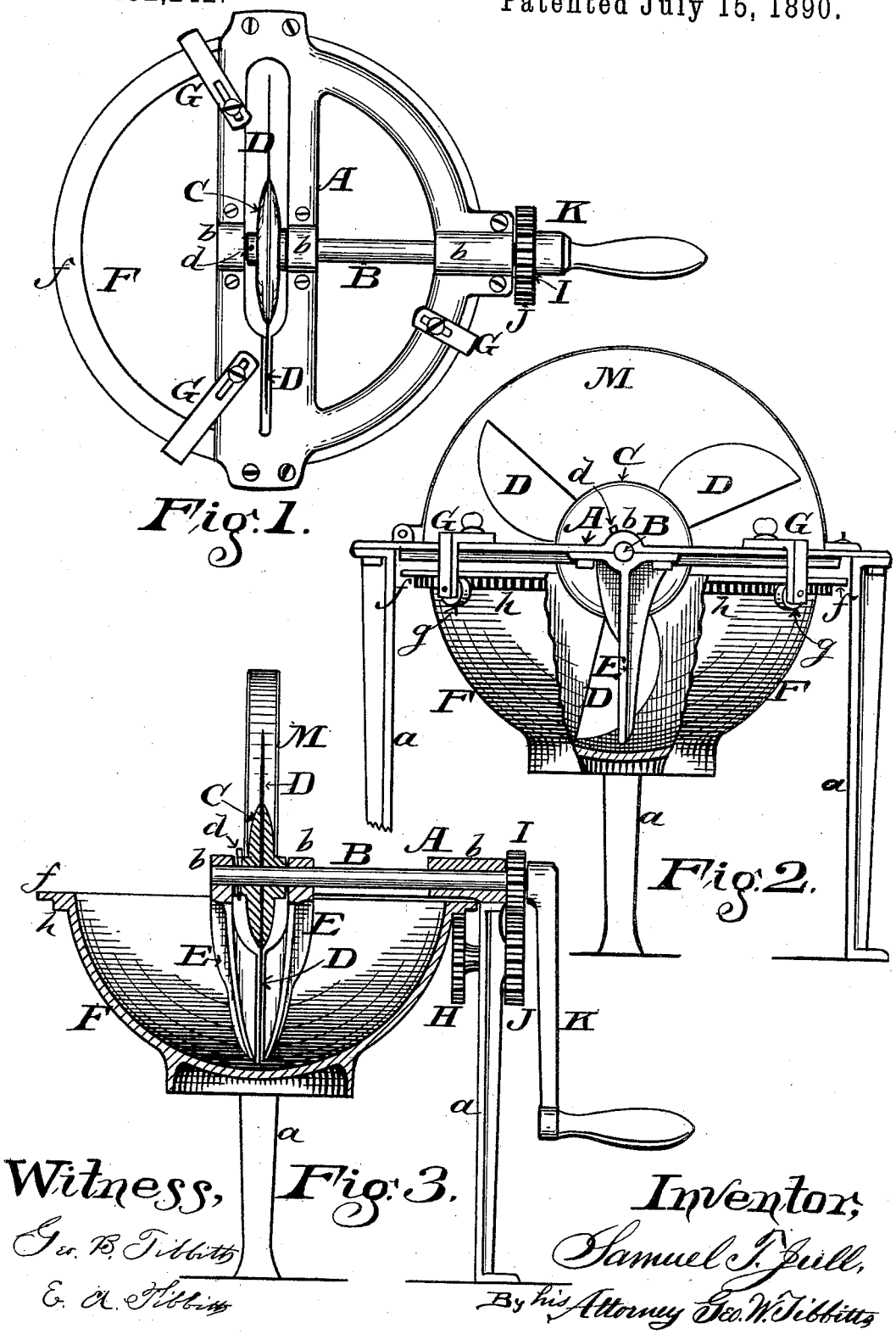

SAMUEL T. JULL, OF MEADVILLE, PENNSYLVANIA, ASSIGNOR OF ONE-HALF TO FARNUM T. FISH, OF SAME PLACE.

MEAT-CUTTING MACHINE.

SPECIFICATION forming part of Letters Patent No. 432,242, dated July 15, 1890.

Application filed December 11, 1889. Serial No. 333,372. (No model.)

*To all whom it may concern:*

Be it known that I, SAMUEL T. JULL, a citizen of the United States, residing at Meadville, in the county of Crawford and State of Pennsylvania, have invented certain new and useful Improvements in Meat-Cutting Machines, of which the following is a specification.

This invention relates to a machine for cutting up meats, &c.; and it consists in the novel construction and combination of parts, substantially as hereinafter fully described, and pointed out in the claims.

In the accompanying drawings, Figure 1 is a top or plan view of my new machine. Fig. 2 is a side elevation with part of bowl and cover broken away to show the rotary cutting-blades, &c.; and Fig. 3 is a transverse vertical section showing shaft, gearing, and support for said rotary cutters, &c.

A is a semicircular top frame supported on three legs $a$ $a$ $a$. In the straight portion of said frame is made a slot in which the cutting-blades revolve.

B is a shaft set in bearings $b$ $b$, made in the said frame for that purpose, and on this shaft, located in the aforesaid slot in the frame A, is attached a hub C, consisting of two disks which clamp the cutting-blades D D. The hub is made to clamp the blades, as well as being secured onto the shaft by means of a tapered key $d$, inserted through the hub and shaft.

E is a hanger made in two parts, attached to and depending from the plate A. One of said parts hangs on each side of the plane of the cutting-blade movements, and they are pretty close together, so that they provide edges on both sides of the blades, against which the cutting is done. The slot in the frame A, on the side where the blades pass up through, is also made narrow for a like purpose, and also prevents the cuttings passing through or following the blades.

F is a bowl having a flange $f$, by which it is supported loosely on adjustable brackets G G, attached to the frame A, and having rollers $g$ $g$, upon which the bowl rides. Within said flange $f$ on the bowl are provided rack-teeth $h$, by which the bowl is rotated.

On the outer end of shaft B is provided a hand-crank K, by which the machine is operated, and on said shaft, just outside of the frame, is placed a pinion I, and below this, on a short shaft having its bearing in the leg $a$ below the frame A, is a gear J, meshing with said pinion I. On the inner end of said short shaft is also placed a gear H, meshing with the rack-teeth $h$ on the bowl. By this gear mechanism the bowl is given a slow rotative movement simultaneously with the revolutions of the cutting-blades. This bowl is removable for convenience of emptying it of the contents. By loosening the brackets on the side of the machine opposite to the crank and gear they may be turned aside, and the bowl can be easily removed and replaced.

M is a cover inclosing the space above the frame in which the cutters revolve. It is hinged at one side, so that it may be turned over, and on the opposite side provided with a latch or button for holding it down.

Having described my invention, what I claim, and desire to secure by Letters Patent, is—

1. In a meat-cutting machine, the combination of revolving cutters D D, secured to shaft B, frame A, provided with suitable bearings for said shaft and having a slot in which said cutters revolve, and the hangers E, arranged on each side of the plane of said cutters' movement and depending from the frame, substantially as and for the purpose specified.

2. In a meat-cutting machine, the combination of revolving cutters D D, secured to shaft B, journaled in slotted frame A, and means for operating them, double hangers E, and the detachable rotative bowl F, provided with annular flange $f$ and rack-teeth, said bowl supported by adjustable brackets G G, having rollers $g$ $g$, and the means for operating same, substantially as described.

SAMUEL T. JULL.

Witnesses:
WIN S. ROSE,
S. STEIN.